United States Patent [19]

Kikuchi et al.

[11] Patent Number: 4,911,818
[45] Date of Patent: Mar. 27, 1990

[54] METHOD AND APPARATUS FOR SURFACE TREATMENT ON AUTOMOTIVE BODIES

[75] Inventors: Uhee Kikuchi; Tadashi Takeo; Kiyohiro Ichinose; Goro Uchida; Hirofumi Hara; Hiroshi Arai, all of Sayama, Japan

[73] Assignee: Honda Giken Kogyo Kabushiki Kaisha, Tokyo, Japan

[21] Appl. No.: 160,938

[22] Filed: Feb. 26, 1988

[30] Foreign Application Priority Data

Feb. 28, 1987 [JP] Japan .................. 62-44070

[51] Int. Cl.⁴ .............. B65G 49/64; B05C 3/02; C25D 13/12; C25D 13/00
[52] U.S. Cl. .............. 204/300 EC; 204/299 EC; 204/181.1; 204/180.7; 204/198; 204/202; 118/409; 118/412; 118/416; 118/423
[58] Field of Search ............. 204/299 EC, 300 EC, 204/180.7, 180.2, 181.1, 181.2, 181.3, 180.6, 181.4, 198, 199, 200, 202, 203, 204, 205, 212, 213, 214, 215, 216, 217, 218, 181.6, 181.7; 118/75, 409, 412, 416, 423

[56] References Cited

FOREIGN PATENT DOCUMENTS

| | | |
|---|---|---|
| 0146437 | 6/1985 | European Pat. Off. . |
| 146437 | 6/1985 | European Pat. Off. . |
| 584432 | 5/1950 | United Kingdom . |
| 644169 | 10/1950 | United Kingdom . |
| 654118 | 6/1951 | United Kingdom . |
| 1395383 | 5/1975 | United Kingdom . |
| 2171935 | 9/1986 | United Kingdom . |

Primary Examiner—John F. Niebling
Assistant Examiner—John S. Starsiak, Jr.
Attorney, Agent, or Firm—Armstrong, Nikaido, Marmelstein, Kubovcik & Murray

[57] ABSTRACT

The present invention is for an apparatus and method of batch type surface treatment on a car body. The car body is rolled in the bath about the horizontal and longitudinal axis of the car body.

7 Claims, 10 Drawing Sheets

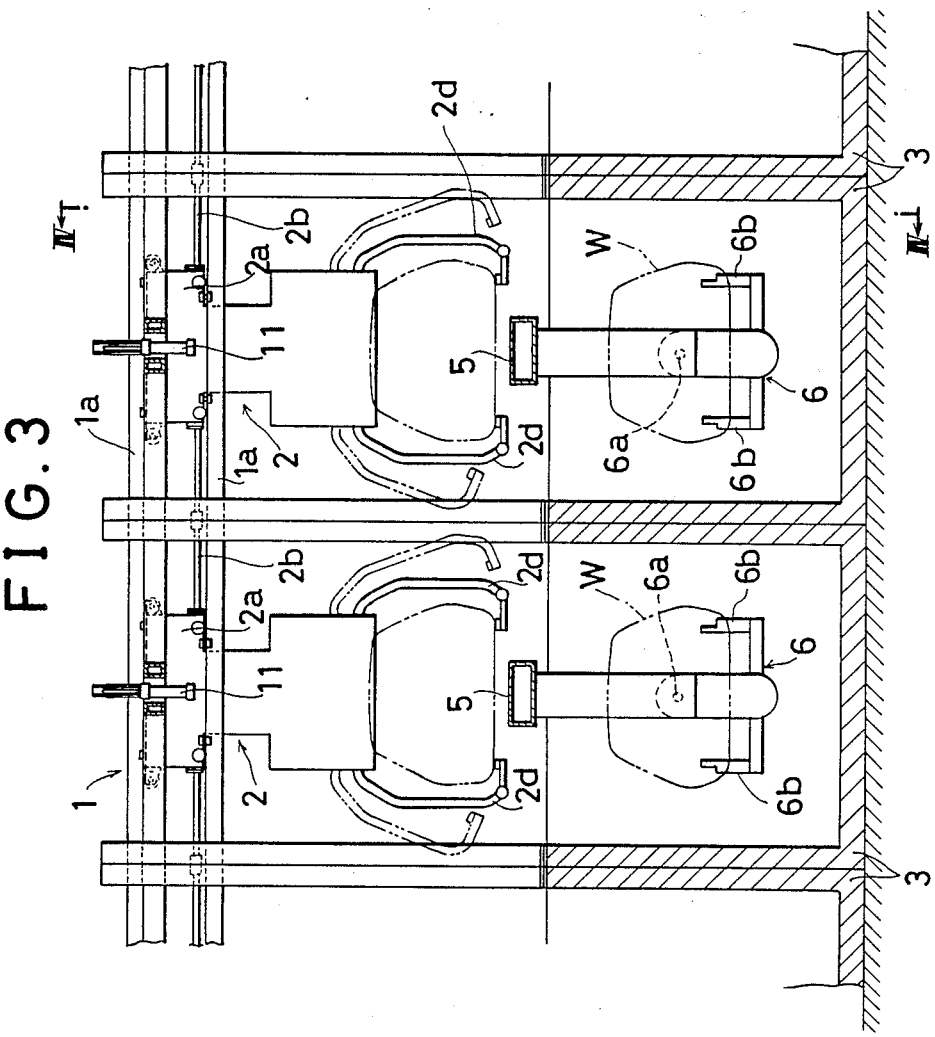

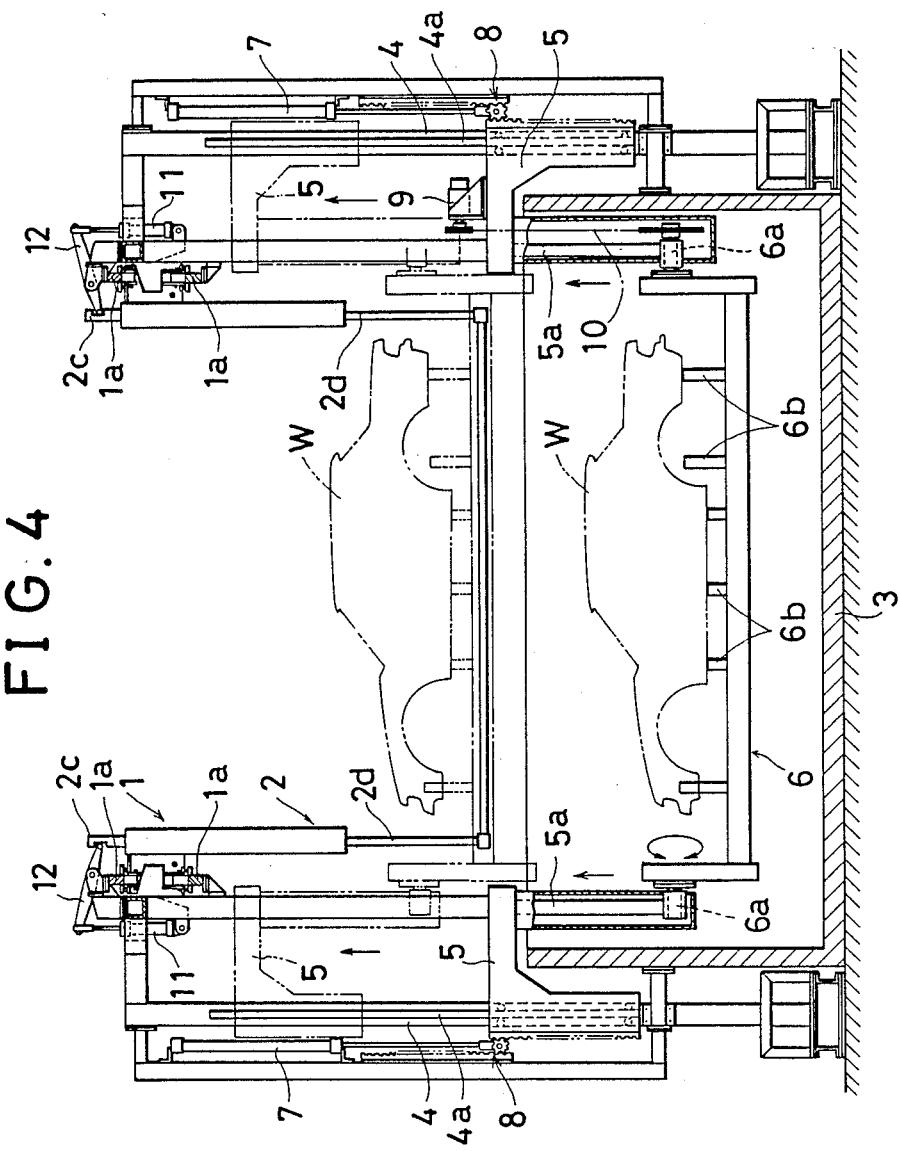

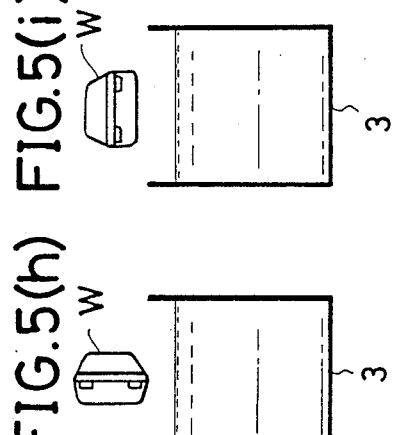
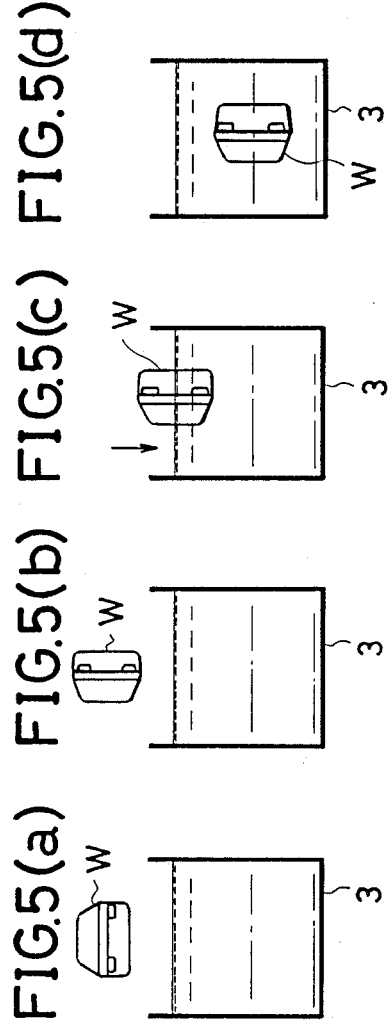
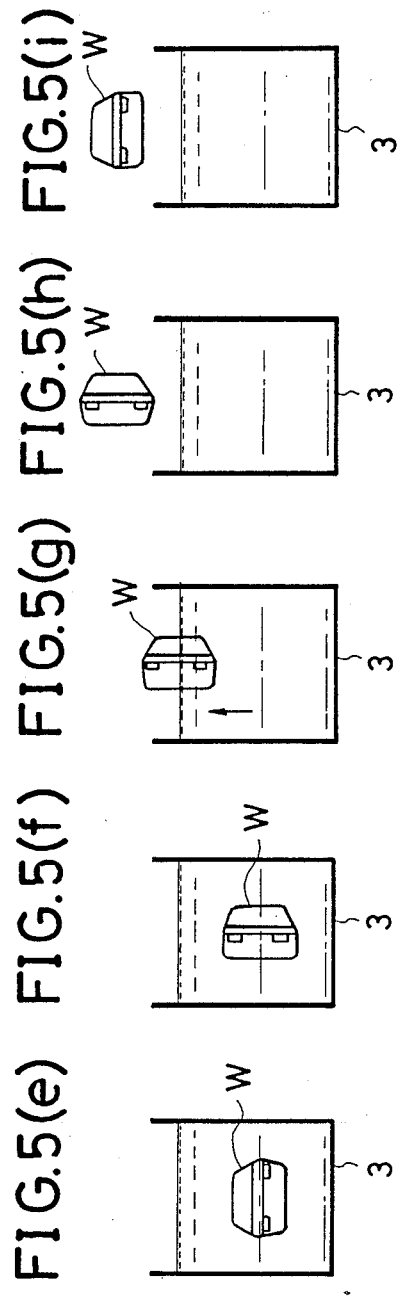

METHOD AND APPARATUS FOR SURFACE TREATMENT ON AUTOMOTIVE BODIES

FIELD OF THE INVENTION

The present invention relates to the method and apparatus for surface treatment on car bodies. The car bodies are immersed in baths of treatment solution to perform surface treatment on the car bodies such as degreasing, forming, electrodeposition or dip coating.

BACKGROUND OF THE INVENTION

The conventional surface treatment method of this kind, as shown in the Japanese Utility Model Publication No. 34025/1985 has boat shaped surface treatment baths arranged longitudinally along the direction in which the car bodies are carried. This method is a type of continuous transport in which the car bodies are successively immersed in one bath after another while being carried. This method has the advantage that the surface treatment bath is large, thus making the overall length of the surface treatment line long. Such a large bath requires a large amount of solution. Also, it is difficult to control the temperature and composition of the solution.

There is also known another type of surface treatment method which is called a batch type method in which carried car bodies are stopped and immersed in the baths. The Japanese Patent Publication No. 31536/1974 and the Japanese Utility Model Laid-Open No. 155374/1986 may be cited as belonging to this type of method. In the former case, a car body is held in a front-or rear-raised vertical posture in which the longitudinal direction of the car body is directed vertical when it is immersed in the bath. In the latter case, a car body is hung from a hanger of a hanger conveyor in such a manner that it is held horizontal in posture with its longitudinal axis extending along the processing line. The hanger, with the car body, is stopped at a predetermined position, where the car body is lowered or lifted by the hanger, to be immersed in or lifted out of the bath while remaining hung from the hanger.

While a batch type surface treatment method has an advantage that the bath can be made smaller and the problems experienced with the foregoing continuous transport type can thus be solved, the method disclosed in the Japanese Patent Publication No. 31536/1974 still has a problem. Since the car body is put into or taken out of the bath while held in the front- or rear-raised vertical posture, the bath has to be made deeper resulting in a significant increase in the overall height of the equipment as a whole including the car body hanging mechanism. Also, an increase in the time required to complete one cycle of operation is needed due to more time being needed for putting the car body into and taking it out of the bath.

The Japanese Utility Model Laid-Open No. 155374/1986, also has a drawback. Although it is free of the foregoing problems as the car body is immersed into or taken out of the bath in its horizontal posture, air may easily be trapped in the ceiling or recessed parts in the car body causing an uneven result of the treatment because the car body is held horizontal in a fixed position while immersed in the solution for the treatment. It is, therefore, desired that the surface treatment processing be carried out with small baths like those of this invention without producing an unevenly treated surface.

SUMMARY OF THE INVENTION

The present invention provides a batch type surface treatment method which meets the above demands and is characterized in that the car body is rolled in the bath about the horizontal and longitudinal axis of the car body.

The car body is cleared of air trapped in the ceiling and recessed thereof, when rolled, thus assuring uniform surface treatment over the entire surface of the car body.

Since the rolling axis of the car body is along a horizontal and longitudinal axis of the car, the baths can be made almost as small as those of the type in which the car body is immersed while in the horizontal posture.

BRIEF DESCRIPTION OF THE DRAWINGS

FIG. 3 is a cross-sectional side view taken along the line III—III of FIG. 2;

FIG. 4 is a cross-sectional front view taken along the line IV—IV of FIG. 3;

FIGS. 5(a) through (i) are diagrams showing the sequence of processing the car body at each station;

DESCRIPTION OF THE PREFERRED EMBODIMENTS

By referring to the attached drawings, one embodiment of this invention will be explained as applied to a surface treatment line or the process line which is arranged to precede the car body painting process.

Figure 1:
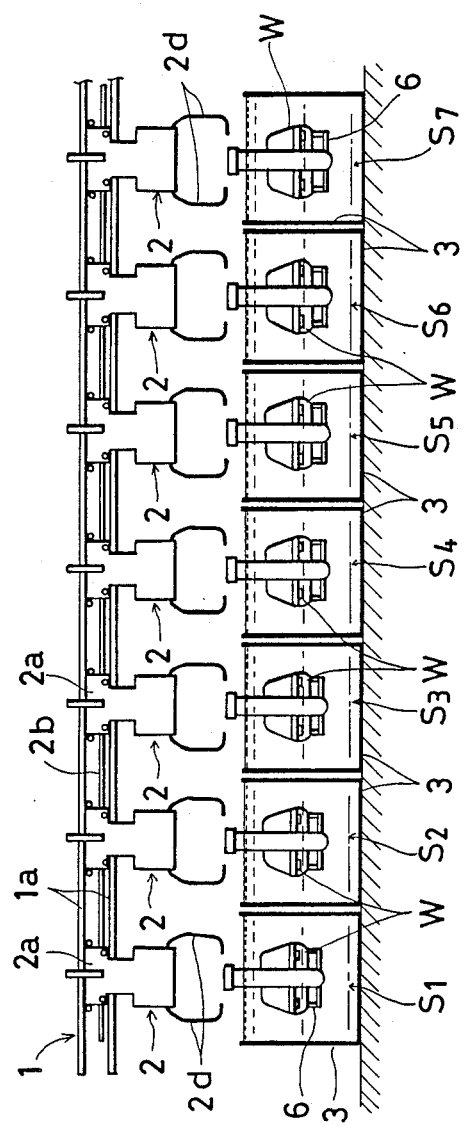
FIG. 1 is a diagram showing one example of the surface treatment process line to which the invention is applied.

FIG. 1 shows the surface treatment line in which are provided, from the starting end toward the finishing end, a first treatment station S1 for a preliminary degreasing processing, a second treatment station S2 for the primary degreasing processing, a third treatment station S3 for a cleaning processing, a fourth treatment station S4 for a surface conditioning processing, a fifth treatment station S5 for a forming processing, a sixth treatment station S6 for a cleaning processing, and a seventh treatment station S7 for a final cleaning processing. Over the surface treatment line is provided a hanger conveyor 1 with hangers 2. The hanger conveyor 1 transports each car body W in order from one station to another by moving each hanger 2, hanging the car body therefrom, in such a way that it is held thereby in a side-facing posture in which its lengthwise direction is perpendicular to the length of the line. When the hanger 2 reaches each station, it stops there and immerses the car body W into a bath 3 of treatment solution disposed at each station for the required surface treatment. The surface treatment line is thus arranged to constitute a batch type surface treatment equipment.

Because the car bodies W are conveyed while being held in the side-facing posture, as described above, the bath at each station can be disposed to have its longitudinal axis directed perpendicular to the surface treatment line. This allows the stations to be arranged closer together, which in turn reduces the overall length of the line.

Figure 2:
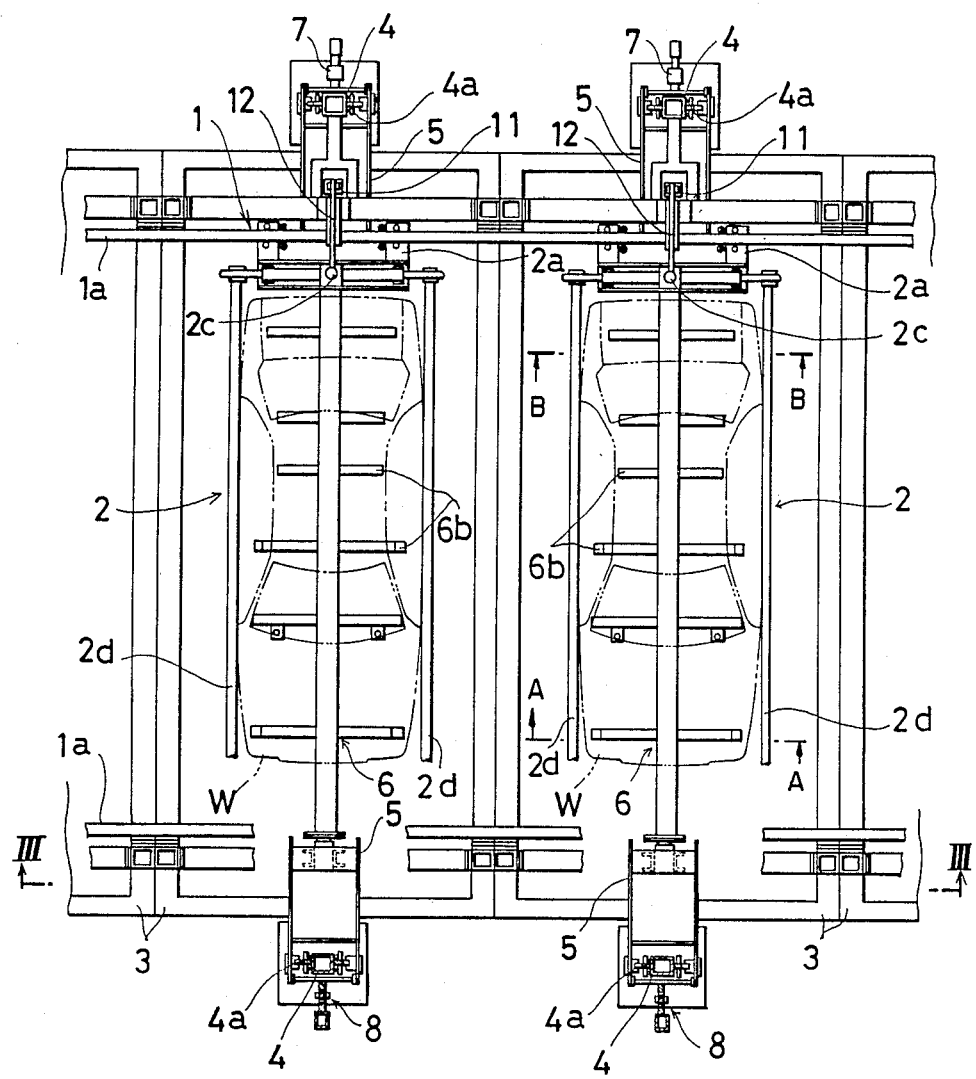
FIG. 2 is a plan view showing an essential part of the line.
Figure 9:
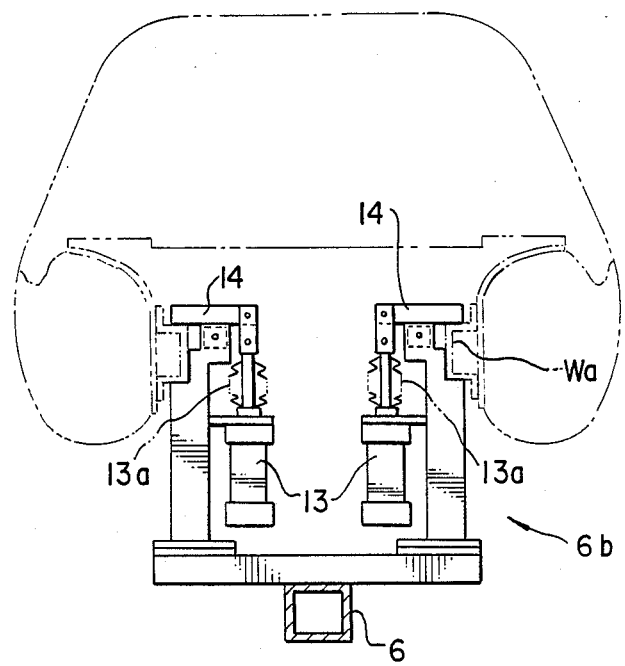
FIG. 9 is a sectional view along line A—A in FIG. 2.
Figure 10:
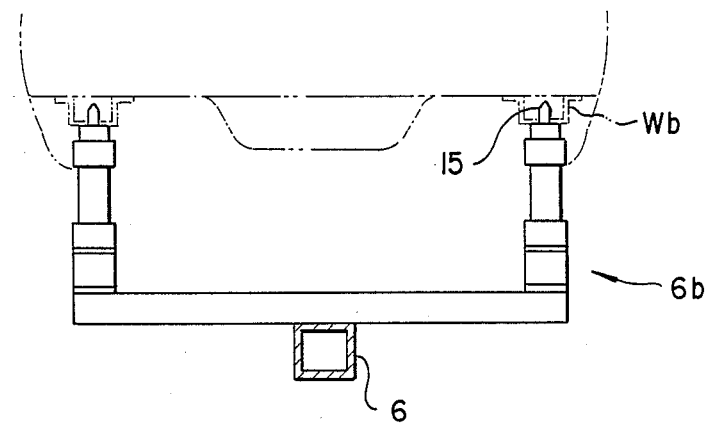
FIG. 10 is a sectional view along line B—B in FIG. 2.
Figure 11:
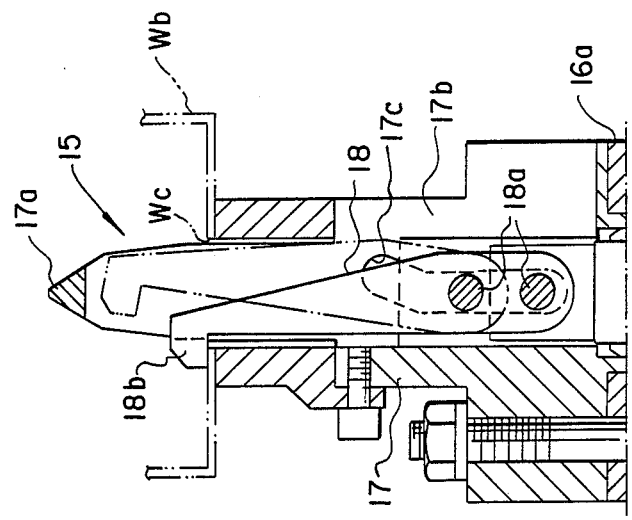
FIG. 11 shows a clamping pin.

As shown in FIGS. 2 through 4, at each station, a pair of posts 4 are erected alongside of the bath 3 in its longitudinal direction. The posts 4 each have guide rails 4a secured thereto on which a pair of lifting frames 5 are supported and can be moved vertically therealong. The pair of lifting frames 5 each have a leg 5a extending downward from the front end of the frame 5 over the bath 3. A jig 6, which supports the car body W, is pivotally supported between the lower ends of the legs 5a of both lifting frames 5. The car body may be grounded through the jig 6, lifting frame 5 and post 4. The jig 6 can be rotated about rotating shafts 6a which are mounted to the lower ends of the legs 5a and located on the horizontal longitudinal axis of the car body. A cover member 5b covers the legs 5a and rotating shafts 6a. The lifting frames 5 are driven by a rack-and-pinion type step-up mechanism 8 with a cylinder 7 as a drive source. As shown in FIG. 9, which is a sectional view taken along line A—A in FIG. 2, the frame Wa which is for mounting the engine on, is clamped by a clamping piece 14 which is opened and closed by a cylinder 13. A bellows-like cover is denoted at 13a. As shown in FIG. 10, which is a sectional view along line B—B in FIG. 2, a clamping pin 15 is inserted into a drip hole formed in the floor frame Wb. The clamping pin 15 is shown in more detail in FIG. 11. The clamping 15 is arranged such that a main body 17 having on a top end a pointed pin portion 17a, that is to be inserted into the drip hole, is fixedly mounted on a cylinder 16. A longitudinal groove is formed on the main body 17. A clamping piece 18 is housed in the longitudinal groove 17b. A pair of upper and lower guide pins 18a are provided in a lower portion of the clamping piece 18 in such a manner as to be engaged with a cam groove 17c. A piston rod 16a of the cylinder 16 is connected to the lower one of the guide pins 18a. The clamping piece 18 is moved along the cam groove 17c upward to the upper unclamped position and downward to the lower clamp position as the piston rod 16a moves upward and downward. A hook portion 18b on the upper end of the clamping piece 18, is engaged with the opening edge of the drip hole. The other clamp member 6b is similarly arranged. The jig 6 is given a vertical movement by the action of both lifting frames 5 and also a rotation produced through a chain 10 by a motor 9 mounted on one of the lifting frames 5. The jig 6 is provided with a plurality of clamping members 6b that clamp the car body W at the side sills or suspension mounting holes to prevent the car body W from coming off when it is rolled sideways as described later. A pinion 8a is turned as it moves upward and downward since the pinion is engaged with the rack 8b mounted on the frame fixedly attached to the post 4. The lifting frame 5 is moved upward and downward by engagement of the rack 8c fastened thereto with the pinion 8a in such manner that it may be moved up and down with each two of the upward and downward movement strokes of the pinion 8a.

Figure 12:
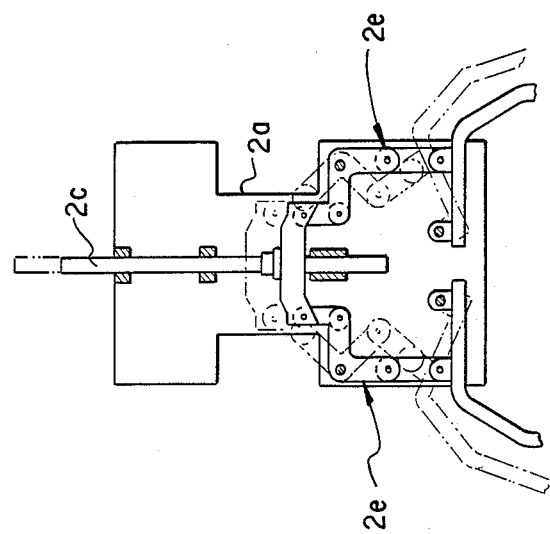
FIG. 12 is a sectional view along line D—D in FIG. 7.

The hanger conveyor 1 is of a shuttle type, i.e., each of the hangers 2 is made to move back and forth between the adjacent station. Each hanger 2 is supported on a conveyor rail 1a, which is provided on each side of the surface treatment line at an elevated position, through a carrier 2a with rollers, so that the hanger 2 can be moved along the conveyor rail. The carriers 2a of the hangers 2 in appropriate numbers are connected to one another through connecting rods 2b. The hangers 2 are reciprocated between the adjacent stations by a drive source, not shown, such as a transport cylinder. Hanger opening levers 12, each driven by a cylinder 11, are provided at the upper part of each station to open and close hanger arms 2d through a rod 2c projecting above the carrier 2a and a link mechanism. The hanger arm 2d, as shown in FIG. 12, is linked with a rod 2c through a linking mechanism 2e built in a carrier 2a. The hanger arm is thus opened and closed with the upward and downward movement of a rod 2c through the interlocked operation.

Next, the surface treatment procedures of the car body W in each station will be explained.

When the car body W is carried by the hanger 2 to a station and is stopped directly above the bath 3, the jig 6 is raised past and between the hanger arms 2d of the hanger 2 until it lifts the car body W. Then the hanger arms 2d are opened to allow the jig 6 to slightly move down. The jig 6 is rotated 90°, so that the car body W is re-postured from the side facing horizontal posture shown in FIG. 5(a) to a side posture with the width of the car body extending in the vertical direction as shown in FIG. 5(b). In this condition, the jig 6 is lowered into the bath 3 to immerse the car body W as shown in FIG. 5(c). During the specified duration of the dipping treatment therein, the jig 6 is rotated in the reverse direction to turn the car body W in the solution from the side posture of FIG. 5(d) to the horizontal position of FIG. 5(e) and then further rotated to another side posture facing the opposite direction to the first posture as shown in FIG. 5(f). After this, the jig 6 is raised to lift up the car body W out of the bath while holding the car body, in that opposite side facing posture as shown in FIG. 5(g). The jig is then rotated 90° again to return the car body posture of FIG. 5(h) to the horizontal one shown in FIG. 5(i). The car body W tat has undergone the treatment in this bath is transferred to the next hanger 2 which has been moved back to and is standing by at this station, in a procedure reverse to the one mentioned earlier. The car body W is now carried by the hanger 2 to the next station.

As explained above, since the car body W is lowered into or lifted out of the bath while being held in a side posture, the solution can easily flow into or out of the car body W through the door openings on the side. This reduces the resistance the car body W receives from the solution. Thus, a smoother and swifter movement of the car body into or out of the solution is assured and also the solution is cleared off better after being taken out of the bath. Furthermore, since the car body W is, after being put in the bath, rolled or swung in the solution, no air bubbles will be trapped in the recess or ceiling, thus enabling uniform surface treatment over the entire surface of the body. Another advantage is that since the car body W is lifted out while being held in the side posture, which is opposite to the one it held when being placed into the bath, one side portion of the car body is immersed for the same duration as the other side. Thus, uneven surface treatment is prevented from occurring which may happen due to immersion time variations.

Figure 6:
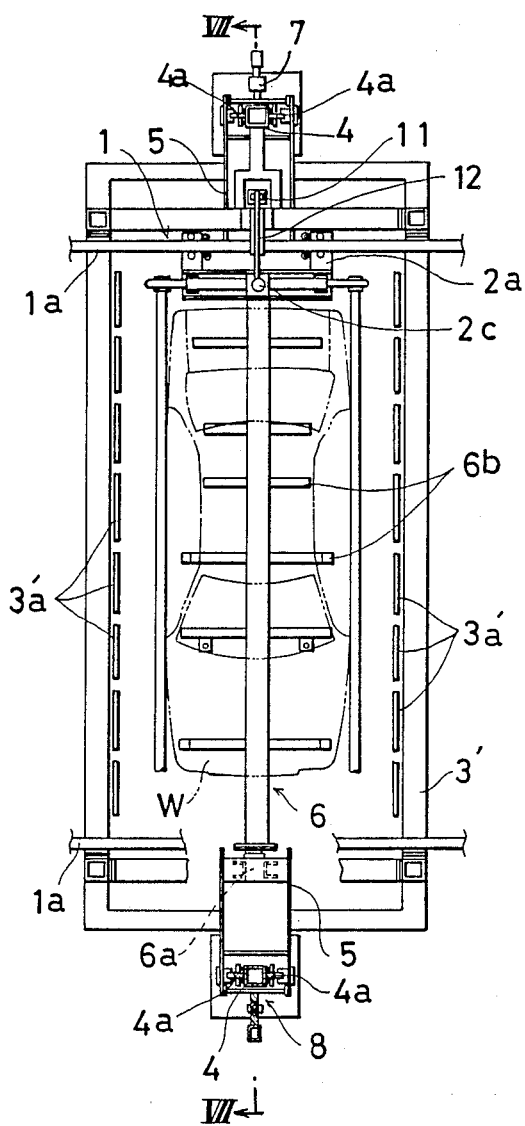
FIG. 6 is a plan view of an electrodeposition station.
Figure 7:
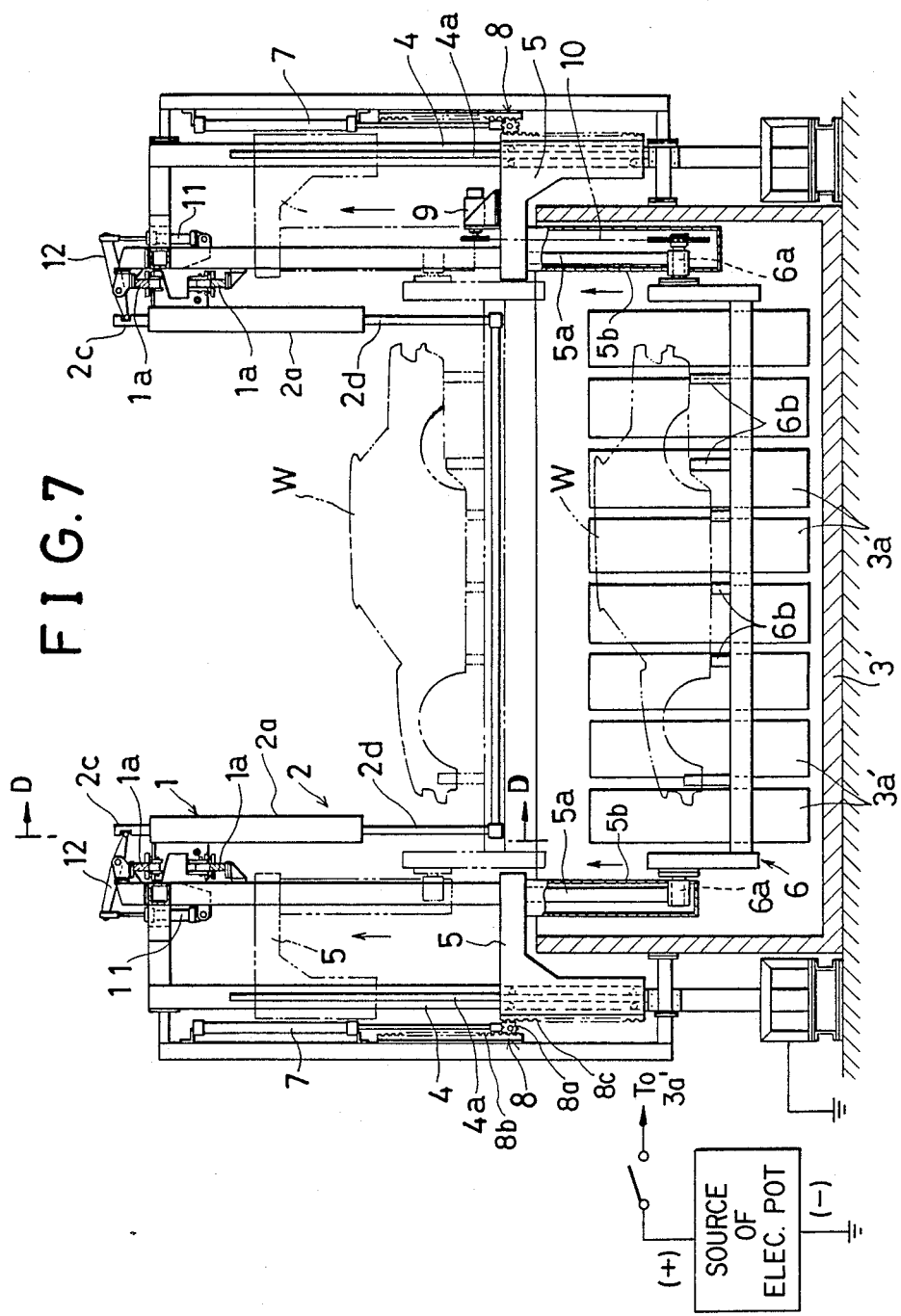
FIG. 7 is a cross-sectional view taken along the line VII—VII of FIG. 6.

Referring to FIGS. 6 and 7, reference numeral 3' designates a bath for electrodeposition (hereinafter referred to as an electrodeposition bath) provided in a surface treatment station that is located after the above seventh station S7. The electrodeposition bath 3' has many electrodes 3a' on the inner side surfaces of the bath.

In the electrodeposition process, it is desired that the lower part of the car body, where a higher rust resistance is needed, have a thicker coating formed thereon. For that purpose, as described in the Japanese Patent Laid-Open No. 46397/1985, a conventional practice is that the car body is completely immersed in the electrodeposition bath where a coating is formed over the entire surface of the car body. Thereafter, the car body is lifted up until the upper part of the body comes out above the solution level so as to have only the lower part of the car body further applied with the electrodeposition thereby increasing the thickness of the coating on the lower part. This method, however, results in an undesirable appearance having a visible line of stepped coating thickness difference formed on the car body sides along the surface level of the solution while the additional electrodeposition is being applied to the lower part of the car body.

Figure 8:
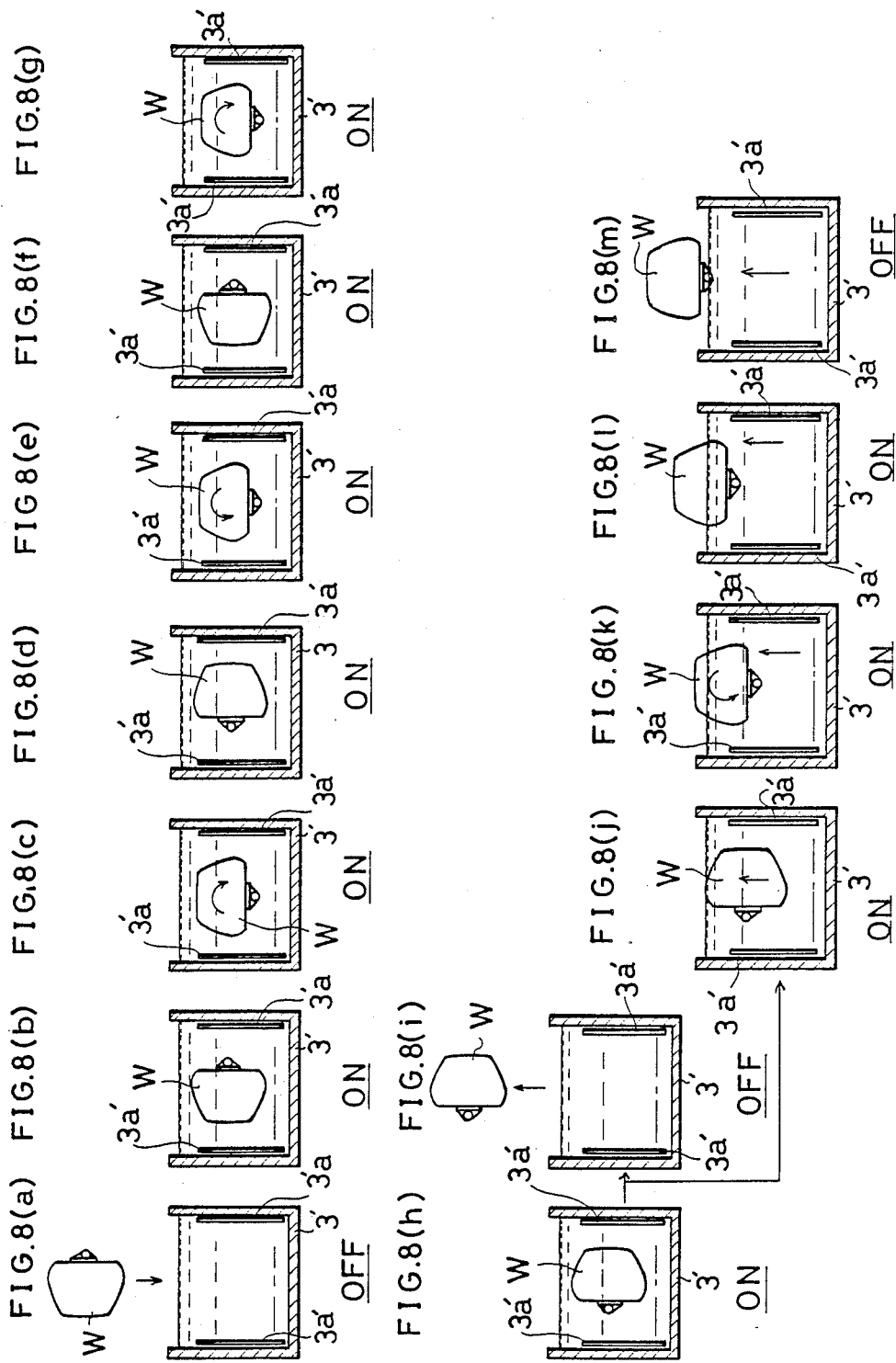
FIGS. 8(a) through (m) are diagrams showing the sequence of electrodeposition processing.

As shown in FIGS. 6 and 7, as is the aforementioned treatment station, this electrodeposition station is likewise provided with a jig 6 which can be vertically moved and rotated. Thus, the car body W is intermittently rolled by the jig 6, and held still in the side posture for a predetermined time, as shown in FIG. 8, to form a thick coating on the lower part of the car body without causing a stepped difference in the coating thickness on the sides of the body.

The car body W is rolled sideways by the jig 6 and this side posture is completely immersed in the electrodeposition bath 3'. Then the electrodes 3a' are energized (FIGS. 8(a) and (b)). After the car body W is held still in this side posture for a specified period of time (for example, 10 seconds), it is slowly rolled by the jig 6 in the reverse direction so that the car body will assume the opposite side posture in about 20 seconds (FIGS. 8(c) and (d)). Next, the car body W is retained in the opposite side posture for a specified duration, after which the car body is returned to the original side posture where it is held for a specified period (FIGS. 8(e) and (f)). After this, the car body W is again rolled in the reverse direction to again assume the opposite side posture where it is retained for a specified time (FIGS. 8(g) and (h)). Then the electrodes 3a' are deenergized and the car body W, which remains held in the opposite side posture, is lifted out of the bath. The electrodeposition process is now completed (FIG. 8(i)).

With the above method, a uniform coating is formed on the sides of the car body W while being rolled. When it is held in the side posture, the floor of the car body W is directed toward the electrodes 3a' on one side of the electrodeposition bath 3' so that it is electroplated to have a thicker coating thereon. When the car body W is held still in this side posture, the roof is directed toward the electrodes 3a' on the other side of the electrodeposition bath 3' and a layer of coating is also formed on the roof. It is, however, possible to prevent the coating on the roof from becoming unnecessarily thick by such means as reducing the voltage applied to the electrodes 3a' facing the roof.

The above method is also advantageous in that since the car body is rolled, it can be cleared of air trapped in recessed parts in the body, thus assuring a quality coating over the entire surface inside and outside of the car body.

Although in the above embodiment the car body W is lifted out of the bath while held in a side posture, it is also possible to lift the car body W up to a predetermined level in the bath where it is returned to the horizontal posture (FIGS. 8(j) an (k)) and, with the electrodes kept energized, lift it up further from there at a slow speed of 20 or 40 mm/sec (FIG. 8( )) so that it may be taken out of the bath in about 30 seconds to one minute (FIG. 8(m)). After the car body W is removed from the bath in this manner, the electrodes are deenergized.

With this method, the electrodeposition coating is continuously performed, even when the car body W is being taken out of the bath. As the car body W is raised, a relative electrode ratio (i.e., the ratio of the electrode area in the bath to the area of the car body W immersed in the solution) gradually increases, which, combined with the fact that the lower the part of the car body W, the longer the time during which it is immersed in the solution, results in the lower part being effectively electroplated to have a thicker coating thereon.

Moreover, since the car body W is raised without being stopped, there is no visible stepped difference in the coating thickness on the sides of the car body.

The car body W may be changed in posture from the one in FIG. 8(h) to the horizontal one before being lifted. In this method, however, the car body W will be subjected to a large resistance when the roof comes out of the solution surface. With the above embodiment, the car body is rolled from the posture in FIG. 8(j) to the horizontal posture so that it can emerge from the liquid with its roof cutting the solution surface. This enables the car body W to get out of the bath smoothly.

Depending on how the lift-up speed of the car body W is set, it may not be necessary to intermittently roll the body in the bath in order to have a required thickness of coating formed on the lower part of the body.

As mentioned above, since the car body is rolled or swung in the bath about the longitudinal horizontal axis of the car body, air trapped in recesses of the car body can be removed assuring uniform surface coating over the entire surface of the body. Furthermore, the present invention permits use of relatively smaller treatment baths to result in reduced installation space.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A batch type car body surface treatment method comprising:
   carrying car bodies along an assembly line;
   stopping and immersing said car bodies in surface treatment baths, the car body being placed into and taken out of the bath while being held in a side posture with a width extending in a vertical direction;

turning the car body in the bath of surface treatment solution about a longitudinal horizontal axis of the car; and taking the car body out of the bath of surface treatment solution in a side posture opposite to the side posture when placed into the bath.

2. A car body surface treatment method comprising:
carrying car bodies along an assembly line;

stopping and immersing said car bodies in surface treatment baths, the car body being placed into and taken out of the bath while being held in a side posture with a width extending in a vertical direction; and intermittently turning the car body in the bath of surface treatment solution about a longitudinal horizontal axis of the car so that the car bodies are held stationary, for a certain period of time, in a side posture with a width extending in a vertical direction, wherein the surface treatment bath is an electrodeposition coating bath.

3. A batch type car body surface treatment method wherein a car body being carried is stopped and immersed in a surface treatment bath for electrodeposition coating, said method further comprising the steps of:

turning the car body about a longitudinal axis of the car so that the car body may be in a side posture with a width extending in a vertical direction;

putting the car body into the bath while being held in the side posture;

energizing electrodes provided in the surface treatment bath and at the same time rolling the car body about said longitudinal axis so as to carry out electrodeposition; and while keeping the electrodes energized, changing the car body to a horizontal posture and then slowly lifting the car body without interruption until the car body is taken out of the bath.

4. A batch type car body surface treatment apparatus comprising:

a surface treatment line;

a plurality of treatment stations spaced from one another along said surface treatment line;

a plurality of surface treatment baths, one surface treatment bath being provided at each treatment station;

a hanger conveyor for conveying, in order, car bodies along said surface treatment line from one treatment station to another, said hanger conveyor including hangers, each hanger having a pair of hanger arms supporting the car body, said hanger conveyor being located above said surface treatment baths;

a jig means, provided at each treatment station, said jig means for receiving the car bodies from one of said hangers of said hanger conveyor, for immersing the car bodies into the surface treatment bath, said jig means moving vertically and rotating about a longitudinal horizontal axis of the car bodies, wherein, at least when the car body is being placed into the surface treatment bath, said jig means moves vertically with said car body being in a side posture;

a pair of lifting frames, that are vertically movable, being provided on both lengthwise sides of each surface treatment bath, and wherein the jig means is pivotally supported between the lifting frames in such a way that said jig means can be rotated about the longitudinal horizontal axis of the car body; and an opening/closing means for opening and closing said pair of hanger arms to transfer the car body between the hanger and jig means.

5. A batch type car body surface treatment apparatus as set forth in claims 4, wherein each car body is conveyed along the line while being hung from said each hanger of the hanger conveyor, each car body being held by each hanger in a side-facing posture in which a lengthwise direction is perpendicular to a length of the surface treatment line, and wherein the surface treatment baths being arranged laterally along the surface treatment line.

6. A car body surface treatment apparatus of a batch type as set forth in claim 4, wherein the hanger conveyor is of a shuttle type in which each hanger is reciprocated between adjacent surface treatment stations.

7. A batch type car body surface treatment apparatus as set forth in claim 4, further comprising a pair of lifting frames, that are vertically movable, being provided on both lengthwise sides of each surface treatment bath, and wherein the jig means is pivotally supported between the lifting frames in such a way that said jig means can be rotated about the longitudinal horizontal axis of the car body, each of the lifting frames having a leg extending downward from a front end of the lifting frame toward the surface treatment bath;

the jig means that supports the car body being pivotally supported between lower ends of the legs of both lifting frames so that the jig means can be rotated about rotating shafts which are located on the longitudinal horizontal axis of the car body;

a cover member being provided to cover each leg together with pivotal support portion of each rotating shaft; and a drive source being provided for rotating the jig means, said drive source being connected to the rotating shaft via a transmission member which is housed in the cover member and mounted on at least one of the lifting frames.

* * * * *